United States Patent Office 3,492,128
Patented Jan. 27, 1970

3,492,128
PREPARATION OF NON-CAKING HEAT-STABLE GRANULAR FOOD GRADE MATERIALS
Edward L. Brennan, Baldwin, and John J. Geminder, Bayside, N.Y., assignors to Chas. Pfizer & Co., Inc., New York, N.Y., a corporation of Delaware
No Drawing. Filed Aug. 9, 1965, Ser. No. 478,442
Int. Cl. A21d 2/00, 6/00
U.S. Cl. 99—95                             3 Claims

ABSTRACT OF THE DISCLOSURE

Non-caking, heat-stable food grade acids, especially citric acid, are prepared by adding to the acids in particulate form between about 10% and 30% by weight of certain liquefied hydrogenated oils, while agitating and maintaining the temperature between about 90° F. and 160° F., and thereafter cooling the admixture to at least below the softening temperature of the oil.

---

This invention relates to food materials. More particularly, it relates to a method of coating food-grade materials which are useful in the manufacture of cake mixes and doughs which are subject to long storage periods.

The utility of acids such as citric, fumaric, malic adipic and tartaric as leavening agents in foodstuff, for example, cake mixes is well known. In this regard, since the aforementioned foodstuff, once packaged, may be stored on the grocer's shelf for a considerable period of time, it is extremely important that said foodstuff retains its stability. Of particular importance is the requirement that the food-grade materials incorporated therein are heat stable and do not cake nor agglomerate. It follows, therefore, that it is highly desirable to provide such food-grade materials in a manner which prohibits caking and imparts stability until the baking temperature pertaining to subsequent processing is reached.

Accordingly, the instant invention discloses a method of producing a non-caking, heat stable food-grade material selected from the group consisting of citric acid, fumaric acid, malic acid, adipic acid, tartaric acid and glucono-delta-lactone which comprises adding to said granular, food-grade material with continuous agitation, a liquefied oil selected from the group consisting of hydrogenated peanut oil, cottonseed oil, coconut oil, babassu oil and tucum oil until a total amount of between about 10% and about 30% by weight of said oil has been added while maintaining the temperature of the admixture between about 90° F. to about 160° F. and thereafter cooling the admixture to at least below the softening temperature of said oil before recovery of product.

Experimentally, the procedure entails melting said oil by heating to a temperature of approximately 150° F. The liquefied oil is subsequently poured into a roller coater containing the food-grade material which is simultaneously agitated during the addition. A stream of hot air maintains the temperature of said roller coater at about 145° F. which is sufficiently higher than the solidification temperature of the oil. One the addition is complete, and even coating has been achieved, a stream of cold air is then applied, stirring continued until solidification takes place, and the product is recovered. It is found surprisingly that the food-grade acid particles so treated retain their discrete particle character with a minimum of agglomeration as a result of the aforesaid process.

With regard to the amount of hydrogenated oil incorporated, it is found that a total amount of between about 10% and about 30% by weight of the total composition provides the most effective formulations. However, more particularly preferred are compositions in which the oil comprises about 15% by weight of the total composition. An advantageous feature of this invention relates to the fact that no solvent is used at any time. As a result, there is no need for the additional step of solvent removal. It follows, therefore, that this advantage provides an attractive process for producing a non-caking, heat stable food-grade material from an economic viewpoint. More important, the compositions prepared therefrom which are incorporated in cake mixes, doughs, and the like, may be stored for long periods of time without adverse effects until the consumer treats it in accordance with usual baking procedures.

Concerning the oils used in the present invention, it is found that their degree of hydrogenation has a direct relationship to their corresponding melting or softening points. Therefore, if one desires a final product which will remain inactive until a certain baking temperature is reached, it is necessary only to incorporate an oil, having a known degree of hydrogenation which posses a softening point at or near the temperature chosen for said baking purposes. The instant invention contemplates products which remain inactive until temperatures from about about 90° F. to about 160° F.

In addition, the instant invention is concerned with citric acid-containing compositions suitable for use in the baking industry which comprise a finely ground citric acid coated with an oil selected from the group consisting of hydrogenated peanut oil, cottonseed oil, coconut oil, babassu oil and tucum oil wherein said oil is present in an amount to provide from about 10% to about 30% by weight of the total composition. Such compositions when incorporated into foodstuff provide formulations which are non-caking and heat stable. In addition, said formulations may be stored for long periods of time without adverse effect.

The following examples are illustrative of the methods and compositions of this invention. They are illustrative and not to be construed as limiting the invention in any manner whatsoever.

EXAMPLE I

Citric acid (1000 g.) is placed in the coating pan of a Colton roller coater and heated to a temperature of 145° F. by means of a hot air stream. While said citric acid is being agitated, liquefied hydrogenated peanut oil (150 g.) at a temperature of 150° F. is added slowly maintaining the resulting mixture at a temperature of 145° F. On completion of addition, the resulting mixture with contained agitation is cooled slowly by administering a cool air stream. When the mixture is cooled to room temperature, agitation is discontinued and the product is recovered.

EXAMPLE II

The procedure of Example I is repeated except the following amounts of hydrogenated peanut oil is added: 100 g., 200 g., 250 g., 300.

Substantially the same results are obtained.

EXAMPLE III

The procedures of Examples I and II are repeated except hydrogenated cottonseed oil is used in place of hydrogenated peanut oil with comparable results.

EXAMPLE IV

The procedure of Example I is repeated wherein fumaric acid is used in lieu of citric acid with comparable results.

EXAMPLE V

The procedure of Example I is repeated wherein adipic acid is used in lieu of citric acid with comparable results.

EXAMPLE VI

The procedure of Example I is repeated wherein tartaric acid is used in lieu of citric acid with comparable results.

EXAMPLE VII

The procedure of Example I is repeated wherein malic acid is used in lieu of citric acid with comparable results.

EXAMPLE XIII

The procedure of Example I is repeated wherein glucono-delta-lactone is used in lieu of citric acid with comparable results.

EXAMPLE IX

The procedure of Example I is repeated except the following hydrogenated oils are used in place of hydrogenated peanut oil and substantially the same results are obtained: coconut oil, babassu oil, tucum oil.

What is claimed is:

1. A method of producing a non-caking, heat stable granular food-grade material selected from the group consisitng of citric acid, fumaric acid, malic acid, adipic acid, tartaric acid and glucono-delta-lactone which comprises adding to said granular, food-grade material with continuous agitation, a liquefied oil selected from the group consisting of hydrogenated peanut oil, cottonseed oil, coconut oil, babassu oil and tucum oil until the total amount of said oil is between about 10% and about 30% by weight of the total composition, while maintaining the temperature of the admixture between about 90° F. and about 160° F. and thereafter cooling the admixture to at least below the softening temperature of said oil.

2. A method as in claim 1 wherein said food-grade material is citric acid and said oil is hydrogenated peanut oil.

3. A method as in claim 1 wherein said food-grade material is citric acid and said oil is hydrogenated cottonseed oil.

References Cited

UNITED STATES PATENTS

| 1,210,940 | 1/1917 | Holbrook | 99—95 |
| 1,214,726 | 2/1917 | Vaygouny | 99—95 |
| 1,286,904 | 12/1918 | Atkinson | 99—95 |
| 1,370,272 | 3/1921 | Blinn | 99—94 |
| 2,000,533 | 5/1935 | Northcutt et al. | 99—199 |
| 2,238,149 | 4/1941 | Aeckerle | 252—384 XR |
| 2,956,926 | 10/1960 | Grief | 167—82 |
| 3,275,450 | 9/1966 | Holstein | 99—94 |

RAYMOND N. JONES, Primary Examiner

U.S. Cl. X.R.

99—94